United States Patent [19]

Sumi

[11] Patent Number: 4,747,066
[45] Date of Patent: May 24, 1988

[54] ARITHMETIC UNIT
[75] Inventor: Masahiko Sumi, Chigasaki, Japan
[73] Assignee: Tokyo Shibaura Denki Kabushiki Kaisha, Kawasaki, Japan
[21] Appl. No.: 572,313
[22] Filed: Jan. 20, 1984
[30] Foreign Application Priority Data
  Jan. 22, 1983 [JP] Japan .................................. 58-8883
[51] Int. Cl.⁴ .............................................. G06F 7/38
[52] U.S. Cl. .................................................. 364/715
[58] Field of Search ... 364/736, 700, 715, 900 MS File

[56] References Cited
U.S. PATENT DOCUMENTS

| | | | |
|---|---|---|---|
| 3,924,110 | 12/1975 | Cochran et al. | 364/900 |
| 4,078,251 | 3/1978 | Hamilton | 364/700 |
| 4,144,566 | 3/1979 | Timsit | 364/200 |
| 4,156,927 | 5/1979 | McElroy | 364/736 |
| 4,164,037 | 8/1979 | Cochran et al. | 364/700 |
| 4,242,675 | 12/1980 | Boone et al. | 364/900 |
| 4,524,455 | 6/1985 | Holsztynski et al. | 364/200 |

FOREIGN PATENT DOCUMENTS 0012242 6/1980 European Pat. Off. .

OTHER PUBLICATIONS

Bennett, "Add a Flag Register to the 900 muP", Electrical Design News, vol. 27, No. 8, Apr. 1982, p. 201, Boston, MA.
David et al., "Single Bit Manipulation", IBM Technical Disclosure Bulletin, vol. 20, No. 7, Dec. 1977, pp. 2543–2546, New York.

Primary Examiner—Gary V. Harkcom
Assistant Examiner—Dale Shaw
Attorney, Agent, or Firm—Foley & Lardner, Schwartz, Jeffery, Schwaab, Mack, Blumenthal & Evans

[57] ABSTRACT

Arthmetic unit for transferring the information at one bit of an accumulator or one of general registers into another bit. The accumulator comprises a first memory circuit while a flag register is used as a second memory circuit. Selection circuits for selecting the data at each bit of the first and second memory circuits are provided. When a given instruction is such that the data stored in the second memory circuit is transferred into a specified bit of the first memory circuit, only the selection circuit corresponding to the specified bit is selected so that the data stored in the second memory circuit is written, whereby the data stored in the second memory circuit is written or transferred into the specified bit of the first memory circuit.

12 Claims, 2 Drawing Sheets

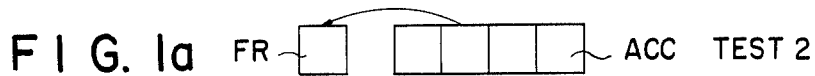
F I G. 1a
F I G. 1b
F I G. 1c
F I G. 2
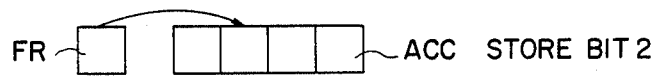
F I G. 5
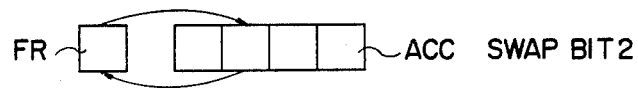
F I G. 3
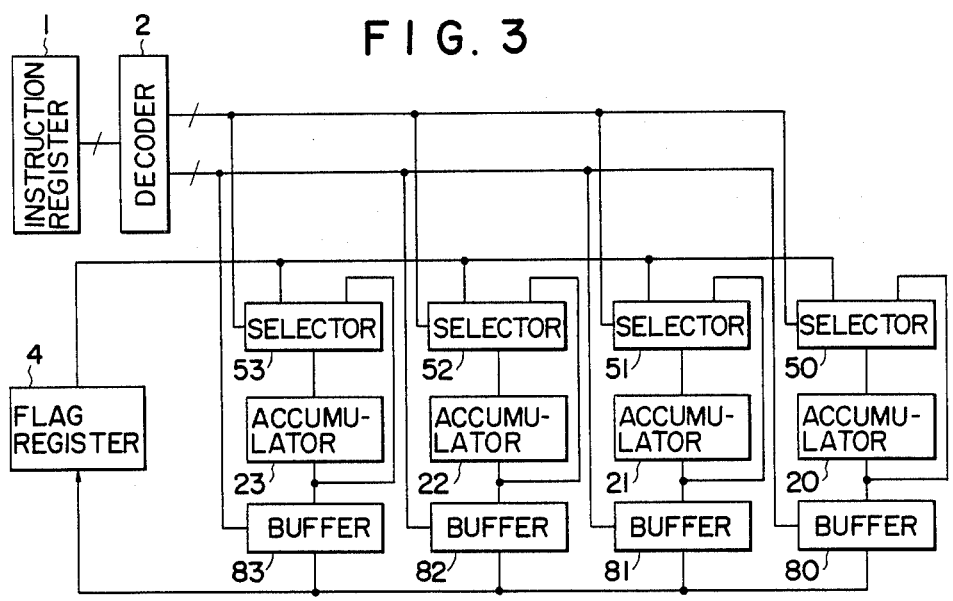

ARITHMETIC UNIT

BACKGROUND OF THE INVENTION

1. Field of the Invention

The present invention relates to an arithmetic unit and more particularly an arithmetic unit for an electronic computer which executes useful bit processing instructions.

2. Technical Background and Problems of the Invention

TEST instruction, SET instruction and RESET instruction have been known as bit processing instructions for processing the information at a specified bit in an accumulator. The TEST instruction is such that the information at a specified bit in an accumulator ACC is transferred into a flag register FR. The SET instruction and the RESET instruction are such that "1" and "0" are written into specified bits of the accumulator ACC. Examples of the TEST, SET and RESET instructions are shown in FIGS. 1(a), (b) and (c), respectively.

There is a need that the information at a certain bit (for example, J bit) in an accumulator is written into another bit (for example K bit). So far this operation has been carried out with the above described instructions as follows:

|       | TEST              | J      |          |
|-------|-------------------|--------|----------|
|       | JUMP              | P      | IF J = 0 |
|       | SET               | K      |          |
|       | JUMP              | P + 1  |          |
| P     | RESET             | K      |          |
| P + 1 | (next instruction)|        |          |

As described above, so far five steps are needed in order to transfer the information at one bit to another bit so that the programming is rather complex and the processing time is relatively long.

The reason is that so far the technical improvements of electronic computers are mainly directed to arithmetic operations, but little attention is paid to the improvement of bit processing control.

SUMMARY OF THE INVENTION

1. Object of the Invention

The present invention was made to overcome the above and other problems encountered in the prior art arithmetic units and has for its object to provide an arithmetic unit in which when information is transferred within an accumulator, program instruction steps are simplified so that a novel bit processing can be accomplished and consequently the processing speed is remarkably increased.

2. Summary of the Invention

To the above and other ends, the present invention provides an arithmetic unit characterized in that each bit is provided with a selection circuit for selecting whether or not the data stored in a second memory circuit is transferred into each bit of a first memory circuit, only the selection circuit corresponding to a specified bit in said first memory circuit is selected in such a way that the data stored in a flag register may be transferred so that a novel bit processing instruction (STORE BIT instruction, See FIG. 2) for transferring the data stored in said second memory circuit into a specified bit in said first memory circuit can be carried out.

BRIEF DESCRIPTION OF THE DRAWINGS

FIGS. 1(a), (b) and (c) show a TEST instruction, a SET instruction and a RESET instruction, respectively;

FIG. 2 is a view used to explain the execution of a STORE BIT instruction;

FIG. 3 is a block diagram of a first embodiment of an arithmetic unit in accordance with the present invention for an electric computer;

FIG. 5 is a view used to explain the execution of a SWAP BIT 2 instruction.

DESCRIPTION OF THE PREFERRED EMBODIMENTS

Figure 4:
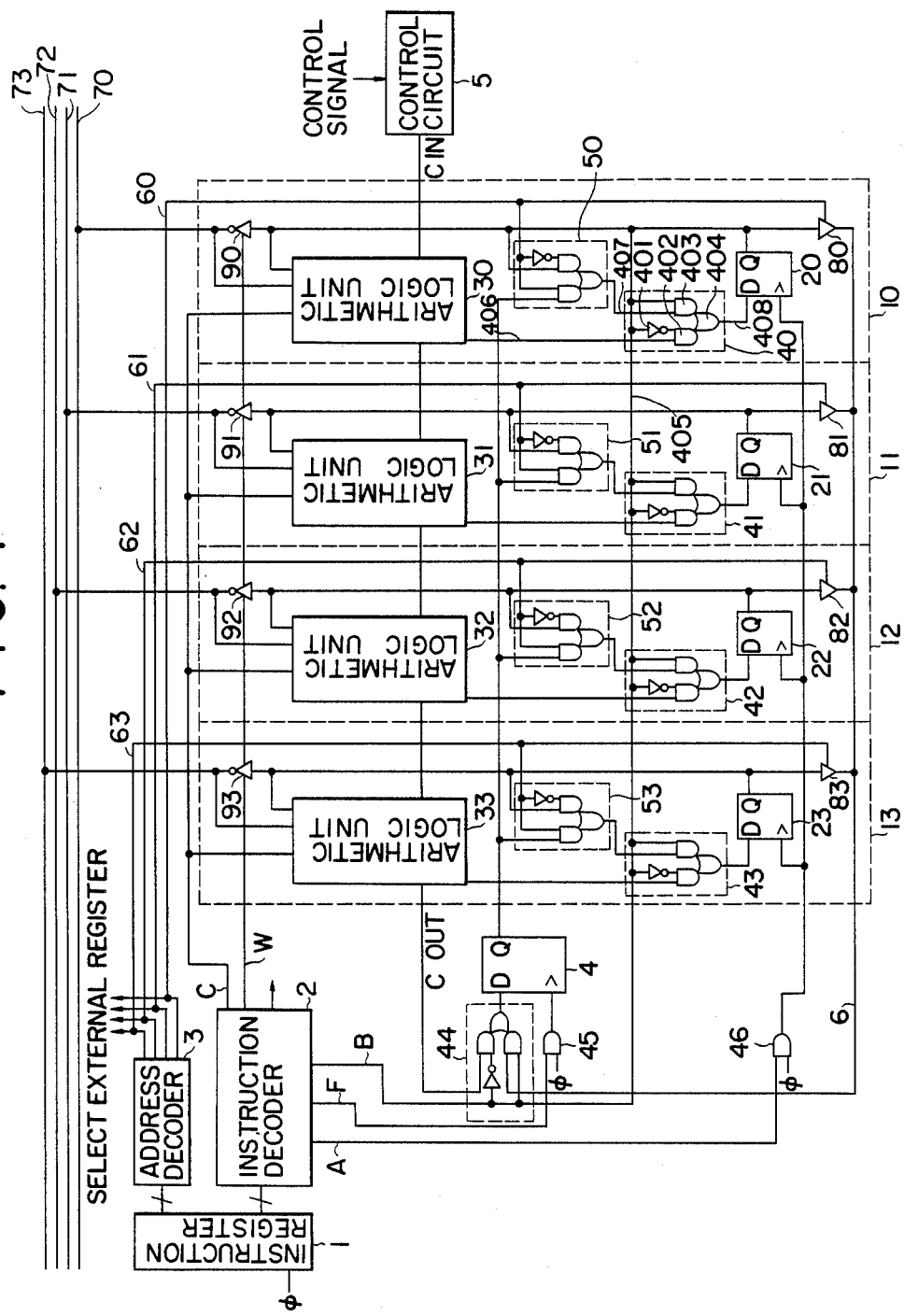
FIG. 4 is a block diagram of a second embodiment of the present invention.

In FIG. 3 is shown in block diagram a first embodiment of an arithmetic unit in accordance with the present invention for an electronic computer. The contents which are stored in an instruction register 1 are decoded by a decoder 2 so that depending upon the decoded contents, the control signals are applied to selectors 50, 51, 52 and 53 and to buffers 80, 81, 82 and 83. Of four accumulators 20, 21, 22 and 23 which store a total of four bits, the 0-bit accumulator 20, the 1-st bit accumulator 21, the 2-nd bit accumulator 22 and the 3-rd bit accumulator 23 are connected to the selectors 50, 51, 52 and 53 and the buffers 80, 81, 82 and 83, respectively. The selectors 50, 51, 52 and 53 are circuits for selecting the contents in a flat register 4 so as to write them into the accumulators 20, 21, 22 and 23 or for selecting the contents in the accumulators 20, 21, 22 and 23 themselves so as to write them into the accumulators 20, 21, 22 and 23. The buffers 80, 81, 82 and 83 are provided with control terminals and are adapted to deliver the contents in the accumulators 20, 21, 22 and 23 into the flag register 4. It suffices for the accumulators 20, 21, 22 and 23 to store the result of an arithmetic operation so that instead of them, a general register may be used.

Next the mode of operation of the first embodiment will be described. It is assumed that a store bit instruction is stored in the instruction register 1. The decoder 2 decodes the output from the instruction register 1 so that the content in the instruction register 1 is identified as "store bit instruction" and the positions of bits to be written (specified bits) are also identified. It is assumed that the specified bit is the second bit. Then the control signal to the selector 52 is enabled so that the second bit selector 52 selects the content in the flag register 4 so as to write it into the second bit accumulator 22. The remaining selectors 50, 51 and 53 select the contents of the accumulators 20, 21 and 23 so as to write them into the accumulators 20, 21 and 23. As a result, when the operations for writing data into the accumulators 20, 21, 22 and 23 are executed under these conditions, the content in the flag register 4 is written into the specified bit or the second bit accumulator 22 while the remaining bits remain unchanged. Thus the store bit instruction has been executed. In the case of the test instruction, the control signal from the decoder 2 is sent to one of the buffers 80, 81, 82 and 83 which has been specified by the test instruction to enabled it so that the content in the specified bit accumulator is transferred into the flag register 4.

As described above, according to the first embodiment, both the store bit instruction and the test instruction can be executed. Therefore, the following two-step program may be used in order to transfer the j-th bit information to the k-th bit:

TEST: J
STORE BIT: K

As a result, the program can be simplified and the processing speed can be increased.

In FIG. 4 is shown in block diagram a second embodiment of an arithmetic unit in accordance with the present invention for an electronic computer. The second embodiment is such that the arithmetic unit of the first embodiment is modified into a practical four-bit circuit. An instruction is stored in the instruction register 1 and the instruction decoder 2 decodes the instruction stored in the instruction register 1. An address decoder 3 decodes the bits specified by the instruction. Blocks 10, 11, 12 and 13 are for each bit. That is, the circuit block 10 corresponds to 0 bit; the circuit block 11 corresponds to a first bit; the circuit block 12 corresponds to a second bit; and the circuit block 13 corresponds to a third bit. The circuit blocks 10, 11, 12 and 13 are similar in construction and comprise arithmetic-logic units (ALU) 30, 31, 32 and 33, selectors 40, 41, 42 and 43, selectors 50, 51, 52 and 53, accumulators 20, 21, 22 and 23, buffers 80, 81, 82 and 83 and buffers 90, 91, 92 and 93. The arithmetic-logic units (ALUs) 30, 31, 32 and 33 perform conventional additions, subtractions and so on and may be of the conventional type.

The selectors 50, 51, 52 and 53 respond to the signal transmitted from signal lines 60, 61, 62 and 63 so as to select the contents in the accumulators 20, 21, 22 and 23 or the content in the flag register 4 in order to transfer the selected contents or content into the selectors 40, 41, 42 and 43. The selectors 40, 41, 42 and 43 respond to the control signal B transmitted from the instruction decoder 2 so as to store into the accumulators 20, 21, 22 and 23 the conventional results of the arithmetic operation or bit-processed result. That is, depending upon whether the instruction is an arithmetic operation instruction or a bit-processing instruction, the contents stored in the accumulators 20, 21, 22 and 23 are different. The selectors 40, 41, 42, 43, 50, 51, 52 and 53 are all similar in construction so that it will suffice to explain only the selector 40. The selector 40 comprises an inverter 401, two AND gates 402 and 403 and an OR gate 404. In response to the control signal transmitted through a control line 405, either of the input signal transmitted from an input line 406 or 407 is selected and delivered to an output line 408.

The buffers 80, 81, 82, 83, 90, 91, 92 and 93 are provided with control terminals. When the input signal "1" is applied to the control terminal, the buffer is conducted, but when the input signal "0" is applied to the control terminal, the buffer is driven into a high resistance state. The buffers 80, 81, 82 and 83 are used to deliver the contents in the accumulators 20, 21, 22 and 23 to a common output line 6, but they respond to the signals transmitted through signal lines 60, 61, 62 and 63 so as to decide whether or not each bit is delivered. The buffers 90, 91, 92 and 93 are the output buffers for the system buses 70, 71, 72 and 73.

The accumulators 20, 21, 22 and 23 and the flag register 4 comprise edge-triggered D latches. The flag register 4 is connected to a selector 44 which selects the input signal to the input terminal D and to an AND gate 45 for operating the flag register 4 in synchronism with a clock $\phi$. A control circuit 5 is a circuit for controlling the carry-in signal (CIN) which is entered into the least significant bit of the accumulators 20, 21, 22 and 23.

Next the mode of operation of the second embodiment will be described. The second embodiment is characterized in that in addition to the bit processing instructions such as test and store bit instructions, it can perform other arithmetic operations such as additions, subtractions and the like. First, the ADD instruction for performing an addition will be described. In response to the ADD instruction, the contents in an external register (not shown) are added to the contents in the accumulators 20, 21, 22 and 23 and the sum remains in the accumulators 20, 21, 22 and 23. When the ADD instruction is stored in the instruction register 1, the instruction decoder 2 enables various control signal lines. The signal for enabling the accumulators 20, 21, 22 and 23 to latch the result of an arithmetic operation is transmitted through a signal line A. A signal for enabling the flag register 4 to latch is transmitted through a signal line F. A control signal for controlling the arithmetic-logic units (ALUs) 30, 31, 32 and 33 is transmitted through a signal line C. The address decoder 3 selects one of the exterior registers and the content in the selected register is transferred through the buses 70, 71, 72 and 73 into the arithmetic-logic units 30, 31, 32 and 33. In response to a signal transmitted from a control line (not shown), the control circuit 5 delivers the carry-in signal; that is, "0". The arithmetic-logic units 30, 31, 32 and 33 function like three-input adders and each bit delivers the result of an arithmetic operation and a carry. The most significant bit carry is transferred into the flag register 4 as a carry out signal C OUT. Since the signal line B is "0", the outputs from the arithmetic-logic units 30, 31, 32 and 33 are selected by the selectors 40, 41, 42 and 43. As a result, the outputs from the arithmetic-logic units 30, 31, 32 and 33 are transferred into the accumulators 20, 21, 22 and 23, whereby the result of the addition is written.

Next the execution of the TEST instruction will be described.

The bit specified by the TEST instruction is decoded by the address decoder 3. For instance, assume that the TEST instruction is "TEST 2" so that the second bit is specified. Then the output from the second bit accumulator 22 is selected by the buffer 82 which is provided with the control signal and is delivered to the common output line 6. The reason is that the signal line 62 from the address decoder 3 is enabled. Since other signal lines 60, 61 and 63 are not enabled, the outputs from the other accumulators 20, 21 and 23 are not delivered to the common output line 6. Since the signal lines B and F are enabled, the data on the common output line 6 is latched by the flag register 4. In this case, the signal line A is not enabled so that the contents in the accumulators 20, 21, 22 and 23 remain unchanged even after the TEST instruction has been executed. In this manner, the specified bit in the accumulators 20, 21, 22 and 23 (in this case, the second bit) is transferred into the flag register 4.

Next the execution of the STORE BIT instruction will be described. After the STORE BIT instruction has been executed, the content in the flag register 4 is stored in the specified bit of the accumulators 20, 21, 22 and 23. The bits except the specified bit remain unchanged. For instance, assume that the instruction is "STORE BIT 2" so that the second bit is specified. Then, the address decoder 3 detects the second bit as a specified bit. As a result, the signal line 62 is enabled so that the content in the flag register 4 is transferred through the selectors 52 and 42 into the second bit accumulator 22 and latched.

That is, the selector 52 selects the content of the flag register 4 and delivers the selected content. Since the signal line B is enabled, the selector 42 selects not the output from the arithmetic-logic unit 32, but the output from the selector 42; that is, the content of the flag register 4. The selected output is delivered to the accumulator 22 and latched. The signal lines 60, 61 and 63 are not enabled so that the selectors 50, 51 and 53 select the contents in the accumulators 20, 21 and 23 and deliver them through the selectors 40, 41 and 43 to the accumulators 20, 21 and 23 where the contents are latched. That is, the contents of the accumulators 20, 21 and 23 themselves are latched. Since the signal line F is not enabled, the content in the flag register remains unchanged.

As described above, according to the second embodiment, in addition to the STORE BIT instruction and the TEST instruction, the conventional arithmetic instructions such as additions, subtractions and so on can be executed. Furthermore as is the case of the first embodiment, a simple program may be used to transfer at a high speed the information at a certain bit to another bit.

In FIG. 4 is shown a practical circuit, but it is to be understood that any other circuitry capable of performing the same function can be used.

FIG. 5 shows the instruction which causes the data at the specified bit of an accumulator (or a general register) to be exchanged with the data in the flag register. The instruction is assumed to be SWAP BIT 2. This instruction is executed as if the TEST instruction and the STORE BIT instruction described above were simultaneously executed. In other words, the instruction SWAP BIT 2 is the combination of the instruction TEST 2 and the instruction STORE BIT 2. The data at the specified bit of the accumulator is exchanged or swapped with the data in the flag register so that the program can be simplified and the high-speed processing becomes possible.

EFFECTS OF THE INVENTION

As described above, according to the present invention, the transfer of bit information within the accumulator can be accomplished by a simple program and at a high speed.

In a control program, a flag register is used in order to represent various information. In this case, there is a need that the content of the flag register must be stored at a specified bit (for instance K bit) of a register (for example REG). Then, according to the pesent invention, the above operation can be performed by the following three steps in a simple manner:

LOAD: REG
STORE BIT: K
STORE: REG

It must be especially emphasized that since the results of various arithmetic operations are stored in the flag registers, it is very convenient in every case that in response to one instruction, the result can be immediately transferred into the accumulator. Thus there is a great merit in writing a program.

Furthermore the STORE BIT instruction and the TEST instruction execute symmetrical operations so that they are very useful in writing a program.

What is claimed is:

1. An arithmetic unit of the type having a decoder circuit for decoding an instruction, a first memory circuit, which has a plurality of bits and can be accessed in parallel, and a second memory circuit, and wherein said arithmetic unit is operative in response to an instruction signal decoded by said decoder circuit, characterized in that:

each data input bit of said first memory is provided with a selection circuit for selecting one of the data stored in said first memory circuit or said second memory circuit so as to write the selected data into each bit of said first memory circuit, and when said instruction signal specifies writing the data stored in said second memory circuit into a specified bit in said first memory circuit, only the selection circuit corresponding to said specified bit is so selected, such that the data stored in said second memory circuit is written into said specified bit of said first memory circuit, and said arithmetic unit, further characterized in that said first memory circuit comprises registers which store results of operations of said arithmetic unit, while said secind memory circuit is a flag register in which is stored a condition code.

2. An arithmetic unit of the type having a decoder circuit for decoding an instruction, a first memory circuit, which has a plurality of bits and can be accessed in parallel, and a second memory circuit, and wherein said arithmetic unit is operative in response to an instruction signal decoded by said decoder circuit, characterized in that:

each data input bit of said first memory is provided with a selection circuit for selecting one of the data stored in said first memory circuit or said second memory circuit so as to write the selected data into each bit of said first memory circuit, and when said instruction signal specifies writing the data stored in said second memory circuit into a specified bit in said first memory circuit, only the selection circuit corresponding to said specified bit is so selected, such that the data stored in said second memory circuit is written into said specified bit of said first memory circuit, and said arithmetic unit, further characterized in that said first memory circuit comprises registers which store results of operations of said arithmetic unit, while said second memory circuit comprises a plurality of flag registers into each of which is stored a condition code.

3. An arithmetic unit of the type having a decoder circuit for decoding an instruction, a first memory circuit, which has a plurality of bits and can be accessed in parallel, and a second memory circuit, and wherein said arithmetic unit is operative in response to an instruction signal decoded by said decoder circuit, characterized in that:

each data input bit of said first memory is provided with a selection circuit for selecting one of the data stored in said first memory circuit or said second memory circuit so as to write the selected data into each bit of said first memory circuit, and when said instruction signal specifies writing the data stored in said second memory circuit into a specified bit in said first memory circuit, only the selection circuit corresponding to said specified bit is so selected, such that the data stored in said second memory circuit is written into said specified bit of said first memory circuit, and said arithmetic unit, further characterized in that said first memory circuit comprises an accumulator, while said second memory circuit comprises a flag register into which is stored a condition code.

4. An arithmetic unit of the type having a decoder circuit for decoding an instruction, a first memory circuit, which has a plurality of bits and can be accessed in parallel, and a second memory circuit, and wherein said arithmetic unit is operative in response to an instruction signal decoded by said decoder circuit, characterized in that:

each data input bit of said first memory is provided with a selection circuit for selecting one of the data stored in said first memory circuit or said second memory circuit so as to write the selected data into each bit of said first memory circuit, and when said instruction signal specifies writing the data stored in said second memory circuit into a specified bit in said first memory circuit, only the selection circuit corresponding to said specified bit is so selected, such that the data stored in said second memory circuit is written into said specified bit of said first memory circuit, and said arithmetic unit, further characterized in that said first memory circuit comprises an accumulator, while said second memory circuit comprises a plurality of flag registers in each of which is stored a condition code.

5. An arithmetic unit of the type having a decoder circuit for decoding an instruction, a first memory circuit, which has a plurality of bits and can be accessed in parallel, and a second memory circuit, and wherein said arithmetic unit is operative in response to an instruction signal decoded by said decoder circuit, characterized in that:

each data input bit of said first memory is provided with a selection circuit for selecting one of the data stored in said first memory circuit or said second memory circuit so as to write the selected data into each bit of said first memory circuit, and when said instruction signal specifies exchanging or swapping the data stored in said second memory circuit with the content at a specified bit within said first memory circuit, only the selection circuit corresponding to said specified bit is so selected as to write the data stored in said second memory circuit while the content at said specified bit is so controlled as to be written into said second memory circuit, whereby the data stored in said second memory circuit is written into said specified bit within said first memory circuit, and said arithmetic unit, further characterized in that said first memory circuit comprises registers which store results of operations of said arithmetic unit, while said second memory circuit comprises a flag register into which is stored a condition code.

6. An arithmetic unit of the type having a decoder circuit for decoding an instruction, a first memory circuit, which has a plurality of bits and can be accessed in parallel, and a second memory circuit, and wherein said arithmetic unit is operative in response to an instruction signal decoded by said decoder circuit, characterized in that:

each data input bit of said first memory is provided with a selection circuit for selecting one of the data stored in said first memory circuit or said second memory circuit, so as to write the selected data into each bit of said first memory circuit, and when said instruction signal specifies exchanging or swapping the data stored in said second memory circuit with the content at a specified bit within said first memory circuit, only the selection circuit corresponding to said specified bit is so selected as to write the data stored in said second memory circuit while the content at said specified bit is so controlled as to be written into said second memory circuit, whereby the data stored in said second memory circuit is written into said specified bit within said first memory circuit, and said arithmetic unit, further characterized in that said first memory circuit comprises registers which store results of operations of said arithmetic unit, while said second memory circuit comprises a plurality of flag registers into each of which is stored a condition code.

7. An arithmetic unit of the type having a decoder circuit for decoding an instruction, a first memory circuit, which has a plurality of bits and can be accessed in parallel, and a second memory circuit, and wherein said arithmetic unit is operative in response to an instruction signal decoded by said decoder circuit, characterized in that:

each data input bit of said first memory is provided with a selection circuit for selecting one of the data stored in said first memory circuit or said second memory circuit, so as to write the selected data into each bit of said first memory circuit, and when said instruction signal specifies exchanging or swapping the data stored in said second memory circuit with the content at a specified bit within said first memory circuit, only the selection circuit corresponding to said specified bit is so selected as to write the data stored in said second memory circuit while the content at said specified bit is so controlled as to be written into said second memory circuit, whereby the data stored in said second memory circuit is written into said specified bit within said first memory circuit, and said arithmetic unit, further characterized in that said first memory circuit comprises an accumulator, while said second memory circuit comprises a flag register into which is stored a condition code.

8. An arithmetic unit of the type having a decoder circuit for decoding an instruction, a first memory circuit, which has a plurality of bits and can be accessed in parallel, and a second memory circuit, and wherein said arithmetic unit is operative in response to an instruction signal decoded by said decoder circuit, characterized in that:

each data input bit of said first memory is provided with a selection circuit for selecting one of the data stored in said first memory circuit or said second memory circuit, so as to write the selected data into each bit of said first memory circuit, and when said instruction signal specifies exchanging or swapping the data stored in said second memory circuit with the content at a specified bit within said first memory circuit, only the selection circuit corresponding to said specified bit is so selected as to write the data stored in said second memory circuit while the content at said specified bit is so controlled as to be written into said second memory circuit, whereby the data stored in said second memory circuit is written into said specified bit within said first memory circuit, and said arithmetic unit, further characterized in that said first memory circuit comprises an accumulator, while said second memory circuit comprises a plurality of flag registers into each of which is stored a condition code.

9. An arithmetic unit comprising:
(a) an instruction register for storing an instruction code,
(b) a decoder connected to said instruction registers for receiving the instruction code and for decoding same to provide a decoded instruction code,
(c) a plurality of selector circuits, each connected to receive said decoded instruction code from said decoder,
(d) a plurality of registers, each register connected to one of said selector circuits,
(e) means for storing a flag signal,
(f) each of said selector circuits having one input connected to said flag signal storing means for receiving said flag signal and another input connected for receiving an output of said connected register,
(g) said decoder providing a STORE decode instruction code for specifying a transfer of the contents of said flag signal storing means into a specified one of said registers,
(h) said selector circuit connected to said specified register receiving said STORE decoded instruction code for transferring said flag signal from said flag storing means to said specified register, and
(i) said non-specified selector circuits receiving said STORE decoded instruction code for transferring outputs of the connected registers to inputs of the same registers to thereby leave the contents of said connected registers unchanged.

10. An arithmetic unit as recited in claim 9 wherein;
(a) said decoder provides a TEST decoded instruction code for specifying a transfer for the contents of a selected one of said registers to said flag storing means,
(b) said selector circuit connected to said selected register receiving said TEST decoded instruction code for transferring the contents of said selected register to said flag storing means, and
(c) said non-selected selector circuits receiving said TEST decoded instruction code for transferring outputs of the connected registers to inputs to the same registers to thereby leave the contents of said connected registers unchanged.

11. An arithmetic unit as recited in claim 9 wherein said plurality of registers form an accumulator.

12. An arithmetic unit as set forth in claim 10 wherein said plurality of registers form an accumulator.

* * * * *